US012661783B2

(12) United States Patent
Jang

(10) Patent No.: US 12,661,783 B2
(45) Date of Patent: Jun. 23, 2026

(54) ROBOT DEVICE FOR TRANSPORTING USED TREATMENT TOOLS TO DISINFECTION ROOM

(71) Applicant: Kwan Ik Jang, Hanam-si (KR)

(72) Inventor: Kwan Ik Jang, Hanam-si (KR)

( * ) Notice: Subject to any disclaimer, the term of this patent is extended or adjusted under 35 U.S.C. 154(b) by 545 days.

(21) Appl. No.: 18/200,999

(22) Filed: May 23, 2023

(65) Prior Publication Data

US 2024/0058959 A1      Feb. 22, 2024

(30) Foreign Application Priority Data

Aug. 18, 2022     (KR) ......................... 10-2022-0103013

(51) Int. Cl.
B25J 9/16          (2006.01)
B25J 5/00          (2006.01)

(52) U.S. Cl.
CPC ............. B25J 9/1664 (2013.01); B25J 5/007 (2013.01); B25J 9/1684 (2013.01)

(58) Field of Classification Search
CPC ............... A61G 12/001; A61G 2203/30; B25J 5/007; B25J 9/1664; B25J 9/1684; B65G 1/065; B65G 65/23; G05D 1/646; G05D 1/667; G05D 1/244; G05D 2109/10; B60P 1/04; B60P 1/12; B60P 1/28; B60P 1/283
See application file for complete search history.

(56) References Cited

U.S. PATENT DOCUMENTS

| | | | | |
|---|---|---|---|---|
| 8,146,695 B1 * | 4/2012 | Ramshur | .............. | G05D 1/0265 |
| | | | | 318/587 |
| 9,120,622 B1 * | 9/2015 | Elazary | .................... | B66F 9/07 |
| 10,052,764 B2 * | 8/2018 | Chelian | .................. | B25J 9/1669 |
| 11,077,559 B2 * | 8/2021 | Cobb | ..................... | G05D 1/024 |
| 11,370,123 B2 * | 6/2022 | Lee | .......................... | B25J 5/007 |
| 11,485,575 B2 * | 11/2022 | Dooley | ................. | B66F 7/0625 |

(Continued)

FOREIGN PATENT DOCUMENTS

| | | | | | |
|---|---|---|---|---|---|
| AU | 2010220973 A1 * | 4/2011 | ................ | B60P 1/12 |
| CN | 108481298 A  * | 9/2018 | ................ | B25J 5/00 |

(Continued)

*Primary Examiner* — Jacob S. Scott
*Assistant Examiner* — Temesgen M. Maru
(74) *Attorney, Agent, or Firm* — Bridgeway IP Law Group, PLLC; Sang Ho Lee; Hyun Woo Shin

(57) ABSTRACT

A robot for transporting used treatment tools to a disinfection room includes a traveling bogie including a bogie body including a driving wheel and a driven wheel, a battery built in the bogie body and supplying power, a control unit outputting a control signal, and a front sensor and a rear sensor for sensing obstacles in front of and at rear of the bogie body in a traveling direction; a housing installed on the top of the traveling bogie; an elevating plate installed inside the housing to be capable of elevation; height adjusting means for adjusting the height of the elevating plate while being supported by the housing; a tray provided on the top of the elevating plate to be position-adjustable and accommodating a treatment tool to be transported; and a tray mover configured to advance the tray toward the front of the housing, allow the tiltedly-accommodated treatment tool to slide down and pour down by gravity, and pull the tray back to the original position after the treatment tool is discharged.

3 Claims, 6 Drawing Sheets

(56) References Cited

U.S. PATENT DOCUMENTS

| 11,912,514 | B2 * | 2/2024 | Futch | B65G 1/0492 |
| 12,037,192 | B2 * | 7/2024 | Ota | B66F 9/19 |
| 12,358,412 | B2 * | 7/2025 | Elazary | B60P 1/34 |
| 2021/0323581 | A1 * | 10/2021 | Ju | B25J 11/0005 |

FOREIGN PATENT DOCUMENTS

| CN | 109291034 | A | * | 2/2019 | B25J 5/007 |
| CN | 109379038 | A | * | 2/2019 | H02S 40/10 |
| JP | H05108153 | A | * | 4/1993 | |
| KR | 10-1280908 | B1 | | 7/2013 | |
| KR | 20190019390 | A | * | 2/2019 | B25J 19/02 |
| KR | 102172226 | B1 | * | 10/2020 | B66F 9/063 |
| KR | 20210156786 | A | * | 12/2021 | B25J 11/008 |

* cited by examiner

ROBOT DEVICE FOR TRANSPORTING USED TREATMENT TOOLS TO DISINFECTION ROOM

CROSS-REFERENCE TO RELATED APPLICATION

This application claims priority to Korean patent application No. 10-2022-0103013, filed on Aug. 18, 2022, the entire disclosure of which is incorporated herein by reference.

TECHNICAL FIELD

The present invention relates to a transport robot for transporting treatment tools used in hospitals, and more particularly, to a robot for transporting used treatment tools to a disinfection room, which automatically performs an operation of transporting used treatment tools from a treatment room to a disinfection room and dipping the used treatment tools in a disinfection tank.

BACKGROUND ART

Various treatment tools used in dentistry, such as handpieces, mirrors, tweezers, explorers, and scalers, must be cleaned and sterilized after use. In particular, fine bone powder or contaminants may deeply penetrate through and be fixed to tools used in, for example, tooth removal or polishing, and thus thorough hygiene management is essential.

The disinfection effect for treatment tools improves as a disinfection time is extended. Accordingly, it is preferable to operate a plurality of frequently used treatment tools so that a used treatment tool may be disinfected as long as possible.

In dental hospitals, there is a separate disinfection room for sterilizing used treatment tools. Nurses or officials collect used treatment tools discharged from the treatment room, transport them to the disinfection room, and then proceed with appropriate disinfection.

However, in the case of large-sized general hospitals, a distance between a treatment room and a disinfection room is not close to each other, and accordingly, it is very inconvenient for nurses to visit the disinfection room with treatment tools every time. In addition, even when professional personnel to collect treatment tools are operated, the time when a treatment tool is discharged for each treatment room is not determined, and thus it is very cumbersome and inefficient for the professional personnel to be contacted and visit the treatment room to collect treatment tools whenever the treatment tools are discharged.

There is a demand for automatic transportation means that visits a treatment room on behalf of a person, collects treatment tools, and transports them to a disinfection room when there is a signal to discharge a treatment tool from the treatment room.

Korean Patent Registration No. 10-1280908 (device and method of driving an object transfer tug robot with excellent self-location tracking and obstacle avoidance) has been proposed as means used for transporting an object in a hospital or the like.

DESCRIPTION OF EMBODIMENTS

Technical Problem

Provided is a robot for transporting patient treatment tools to a disinfection room, the robot being capable of replacing the previous hassle of people by performing, under its own judgment, a series of actions of visiting a treatment room that has generated a call signal, receiving a treatment tool discharged from the treatment room, and transporting the received treatment tool to a disinfection room.

Technical Solution

According to an embodiment of the present invention, a robot for transporting used treatment tools to a disinfection room autonomously travels along a traveling detection line, receives a treatment tool discharged from a treatment room, and transports the treatment tool to the disinfection room, in a place where the traveling detection line connecting the treatment room to the disinfection room is disposed on the floor, and includes a traveling bogie comprising a bogie body including a driving wheel and a driven wheel, a battery built in the bogie body and supplying power, a control unit outputting a control signal, a tracking sensor for sensing the traveling detection line, and a front sensor and a rear sensor for sensing obstacles in front of and at rear of the bogie body in a traveling direction; a housing installed on the top of the traveling bogie and providing support; an elevating plate installed inside the housing to be capable of elevation; height adjusting means for adjusting the height of the elevating plate while being supported by the housing; a tray provided on the top of the elevating plate to be position-adjustable and accommodating a treatment tool to be transported; and a tray mover configured to advance the tray toward the front of the housing, allow the tiltedly-accommodated treatment tool to slide down and pour down by gravity, and pull the tray back to the original position after the treatment tool is discharged.

A sink having a disinfection tank is installed in the disinfection room. A height display unit informing the height of the disinfection tank is fixed to a front surface of an upper portion of the sink. The elevating plate takes the form of a plate and has female screw holes at both ends, and a front sensor configured to sense the height display unit and transmit a detection signal to the control unit when the elevating plate moves up and down and is located at the same height as the height display unit is installed in front of the elevating plate. The height adjusting means includes vertical lead screws screwed into the female screw holes, extending vertically, and supported by the housing to be axially rotatable, and a height control motor operated by the control unit and adjusting the height of the elevating plate by axially rotating the vertical lead screws.

A curved rail configured to support the tray to be movable in forward and backward directions, the curved rail having a traveling surface portion formed on its upper surface and a rack gear portion provided on its lower surface, and inclined downward toward the front, and a supporter configured to lift the curved rail from an upper surface of the elevating plate to provide a rail lower space under the curved rail are further installed on an upper surface of the elevating plate. The tray mover includes a support bracket fixed to a lower surface of the tray; a wheel bearing supported by the support bracket and capable of traveling along the traveling surface portion while being seated on the traveling surface portion; a pinion gear located in the rail lower space and meshing with the rack gear portion; and a tray transfer motor that is supported by the support bracket and rotates the pinion gear.

The traveling surface portion includes a horizontal traveling path that is horizontal at the top of the elevating plate, and a curved downward traveling path that increases in inclination toward the front. The tray includes a bottom plate fixed to the support bracket; and side walls fixed vertically to both ends and a rear end of the bottom plate. A door connected to the side walls by a torsion hinge, closed by an action of the torsion hinge when the tray is in a horizontal state, and opened by being pushed by the weight of the treatment tool sliding down when the tray is tilted forwards is installed in front of the bottom plate.

Effects of Disclosure

A robot for transporting patient treatment tools to a disinfection room according to the present invention having such a structure as described above may replace the previous hassle of people by performing, under its own judgment, a series of actions of visiting a treatment room that has generated a call signal, receiving a treatment tool discharged from the treatment room, and transporting the received treatment tool to a disinfection room.

DETAILED DESCRIPTION

An embodiment of the present invention will now be described in more detail with reference to the accompanying drawings.

Figure 1:
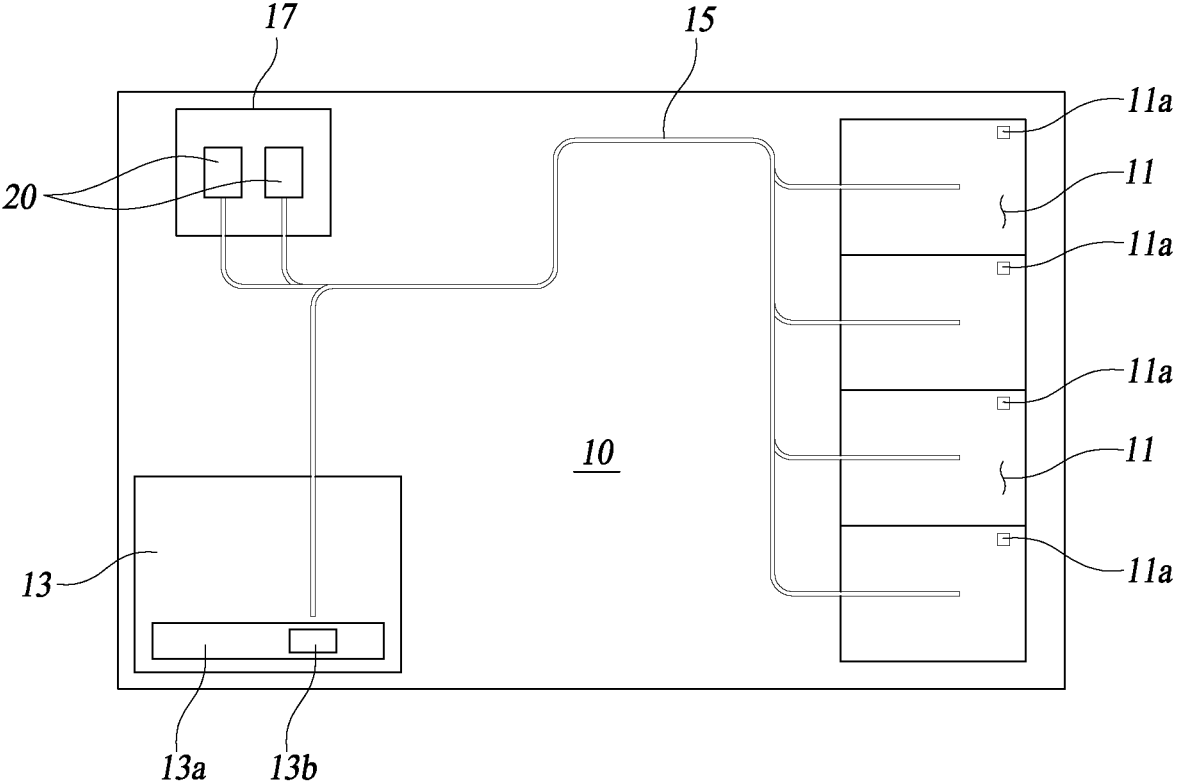
FIG. 1 is a plan view of an indoor space for explaining an operation method of a robot for transporting used treatment tools to a disinfection room, according to an embodiment of the present invention.

FIG. 1 is a plan view of an indoor space 10 of a dental hospital for explaining an operation method of a robot 20 for transporting used treatment tools to a disinfection room, according to an embodiment of the present invention.

As shown in FIG. 1, a plurality of treatment rooms 11 and a disinfection room 13 are arranged in the interior of a hospital, and a wireless charging room 17 is located at one corner. Dental treatments are performed in the treatment rooms 11. A call signal generator 11a is installed in each of the treatment rooms 11. The call signal generator 11a is a switch operated by a doctor or nurse. When the call signal generator 11a is pressed, the robot 20 visits the treatment room 11. The robot 20 receives a used treatment tool discharged from the treatment room 11 and transports the used treatment tool to the disinfection room 13.

In the disinfection room 13, related equipment (not shown) for sterilizing and disinfecting treatment tools and a sink 13a are located. A disinfection tank 13b is installed in the sink 13a. A disinfectant solution is contained in the disinfectant tank 13b. A height display unit 13c is disposed on a front surface of the sink 13a. The height display unit 13c is a to-be-sensed member that is sensed by a front sensor 59 to be described later, and informs the height of the disinfection tank 13b.

When the robot 20 receives a call signal while waiting in the wireless charging room 17, the robot 20 repeats actions of visiting the treatment room 11, receiving a used treatment tool, moving to the disinfection room 13, and putting the used treatment tool into the disinfection tank 13b. The robot 20 replaces a cumbersome work that previously depends on manpower. The robot and the call signal generator 11a are connected to each other by short-distance wireless communication.

A travel detection line 15 is disposed on the floor of the indoor space 10. The travel detection line 15 is a movement line for the robot 20. The robot 20 travels along the travel detection line 15. This traveling method is general, and thus a description thereof will be omitted.

Figure 2:
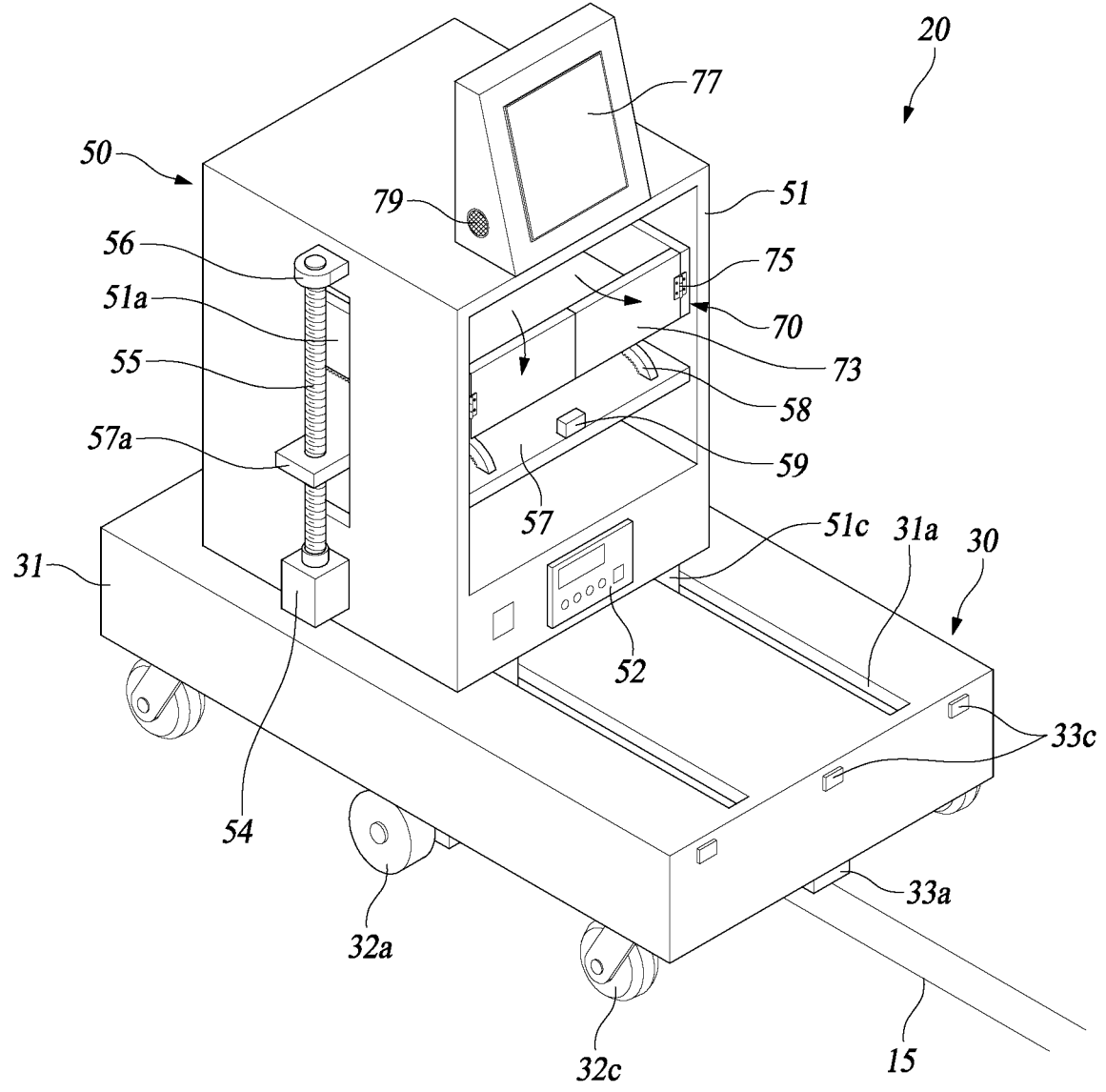
FIG. 2 is a perspective view of a robot for transporting used treatment tools to a disinfection room, according to an embodiment of the present invention.
Figure 3:
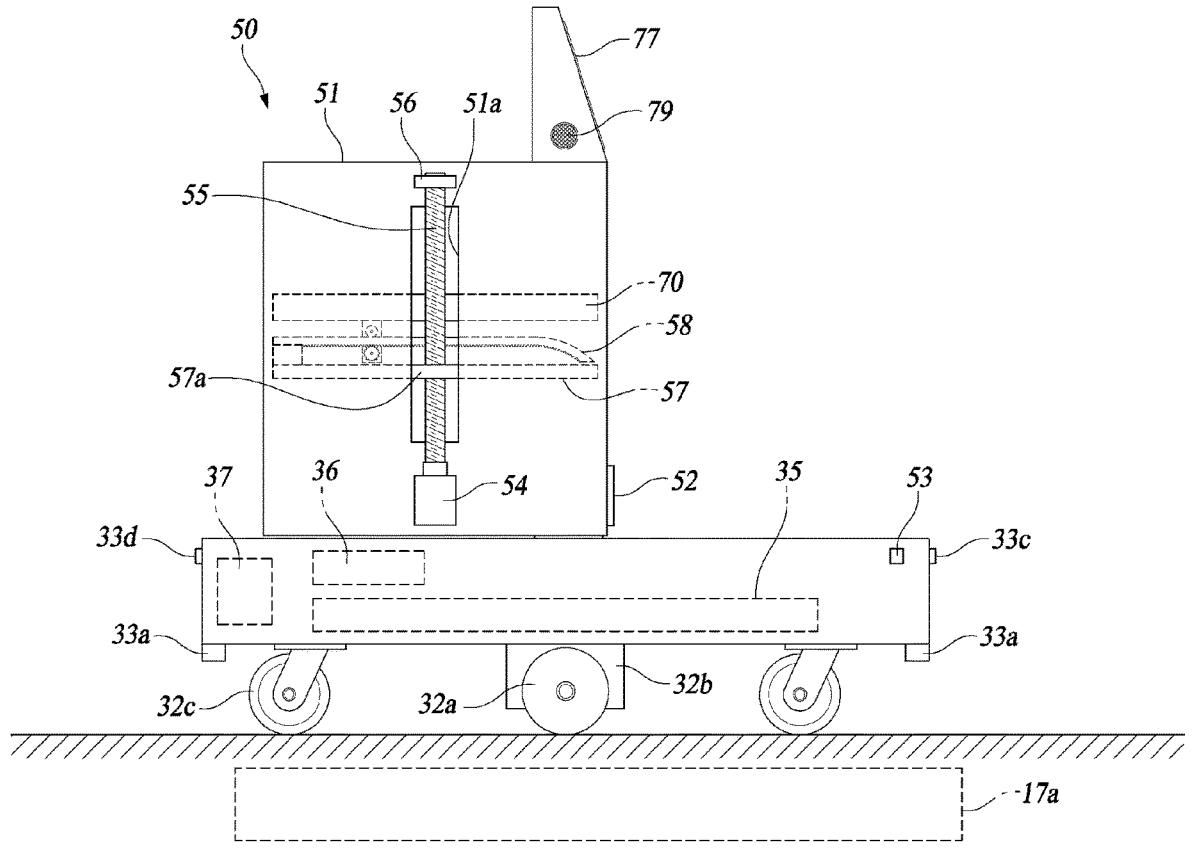
FIG. 3 is a side view of the robot of FIG. 2.
Figure 4:
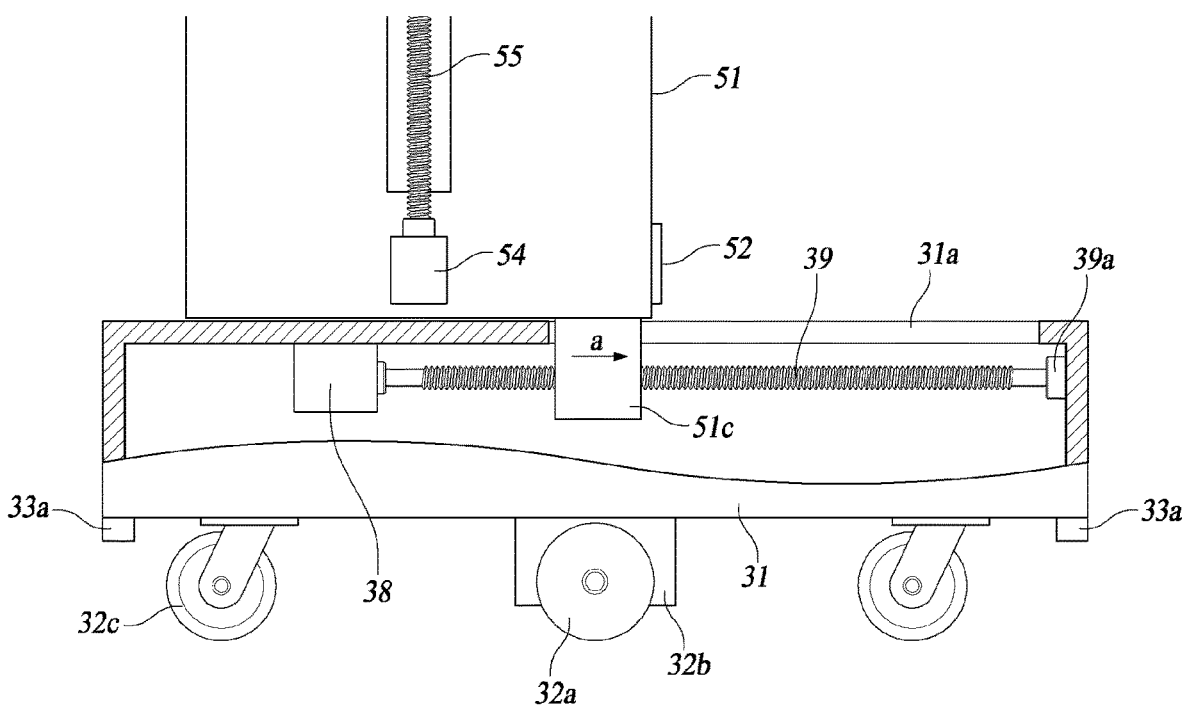
FIG. 4 is a view for explaining the movement principle of a carrier of FIG. 2.
Figure 5:
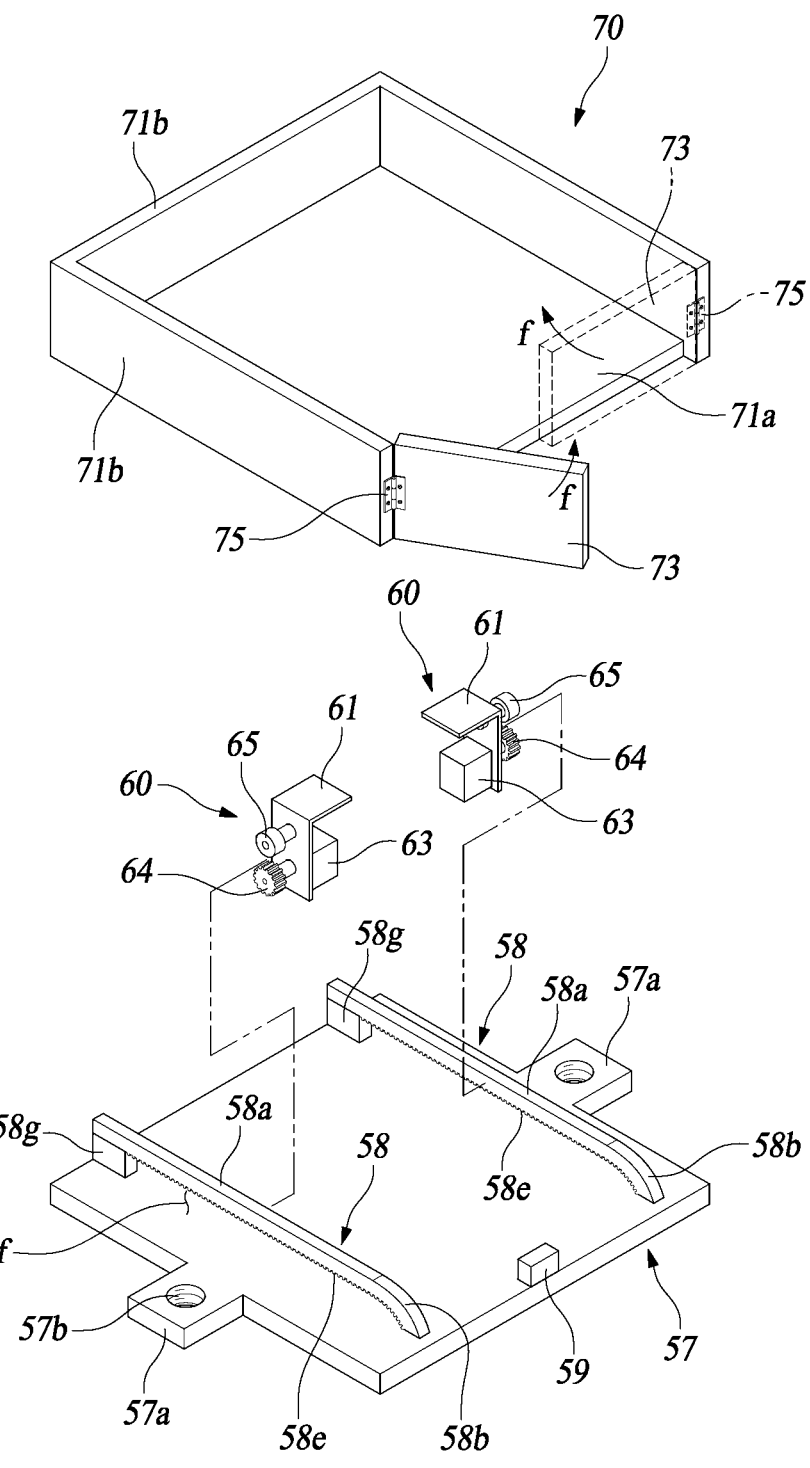
FIG. 5 is an exploded perspective view of an elevating plate and a tray shown in FIG. 2.

FIG. 2 is a perspective view of the robot 20 for transporting used treatment tools to a disinfection room, according to an embodiment of the present invention. FIG. 3 is a side view of the robot 20 of FIG. 2. FIG. 4 is a view for explaining the moving principle of a carrier of FIG. 2, and FIG. 5 is an exploded perspective view of an elevating plate and a tray shown in FIG. 2.

As shown in the drawings, the robot 20 according to the present embodiment has a traveling bogie 30 and an unloader 50. The unloader 50 includes a housing 51, an elevating plate 57, height adjusting means, curved rails 58, a tray mover 60, a tray 70, and a touch panel 77.

The traveling bogie 30 is traveling means that travels along a travel detection line 15 disposed on the floor while supporting the unloader 50.

The traveling bogie 30 includes a bogie body 31, a wireless power reception unit 35, a control unit 36, a battery 37, a communication unit 53, a tracking sensor 33a, front sensors 33c, rear sensors 33d, an interval control motor 38, and a horizontal lead screw 39.

The bogie body 31, which is a box-shaped member, has two guide slits 31a on its upper surface. The guide slits 31a are parallel to each other and accommodate screw coupling blocks 51c. The screw coupling blocks 51c move linearly in a direction indicated by arrow a or in its opposite direction while being accommodated in the guide slits 31a.

Driving wheels 32a and driven wheels 32c are installed below the bogie body 31. The driving wheels 32a are located on both sides of a central portion of the bogie body 31, and perform a rolling motion by receiving rotational force from the wheel motor 32b. The wheel motor 32b is operated by the control unit 36 to operate each of the driving wheels 32a. The driven wheels 32c keep the bogie body 31 level. For example, the driven wheels 32c prevent the bogie body 31 from tilting forwards or backwards.

In a state of being located over a wireless power transmission unit 17a of FIG. 13, the wireless power reception unit 35 receives a magnetic force from the wireless power transmission unit 17a and then converts the magnetic force into electricity. The converted electricity is charged in the battery 37. This wireless charging method is general, and thus a description thereof will be omitted. The wireless power transmission unit 17a is located below the bottom surface of the wireless charging room 17.

The control unit 36 controls the overall operation of the robot 20. For example, the control unit 36 controls traveling of the traveling bogie 30, an elevating motion of the elevating plate 57, and forward and backward motions of the tray 70.

The battery 37, which is a rechargeable battery, supplies power necessary for driving the robot 20. The battery 37 may also be charged in a wired manner.

The communication unit 53 is wirelessly connected to the call signal generator 11*a*. Signals output by the call signal generators 11*a* are transmitted to the communication unit 53. The signal reception by the communication unit 53 is transmitted to the control unit 36 so that the control unit 36 moves the traveling bogie 30.

The tracking sensor 33*a* senses the travel detection line 15. While the traveling bogie 30 is moving, the tracking sensor 33*a* continuously senses the travel detection line 15 and sends detection information to the control unit 36. The control unit 36 controls the traveling of the traveling bogie 30 through the detection information of the tracking sensor 33*a*.

The front sensors 33*c* and the rear sensors 33*d* are located on the front and rear surfaces of the bogie body 31, respectively, and detect traveling obstacles. Sensing information of the front sensors 33*c* and the rear sensors 33*d* is transmitted to the control unit 36 in real time. While the robot 20 is traveling, when an obstacle appears in front in a traveling direction, the robot 20 immediately stops.

The interval control motor 38 is fixed to an upper side of the bogie body 31 and axially rotates the horizontal lead screw 39 in both directions. The horizontal lead screw 39 is horizontally installed vertically under each of the guide slits 31*a*, and an extending end of the horizontal lead screw 39 is supported by a screw bearing 39*a*. A screw coupling block 51*c* is coupled to the horizontal lead screw 39. The screw coupling block 51*c* is a block-type member fixed to a lower surface of the housing 51, and has a female screw portion (not shown) therein.

Figures 6A, 6B, 6C:
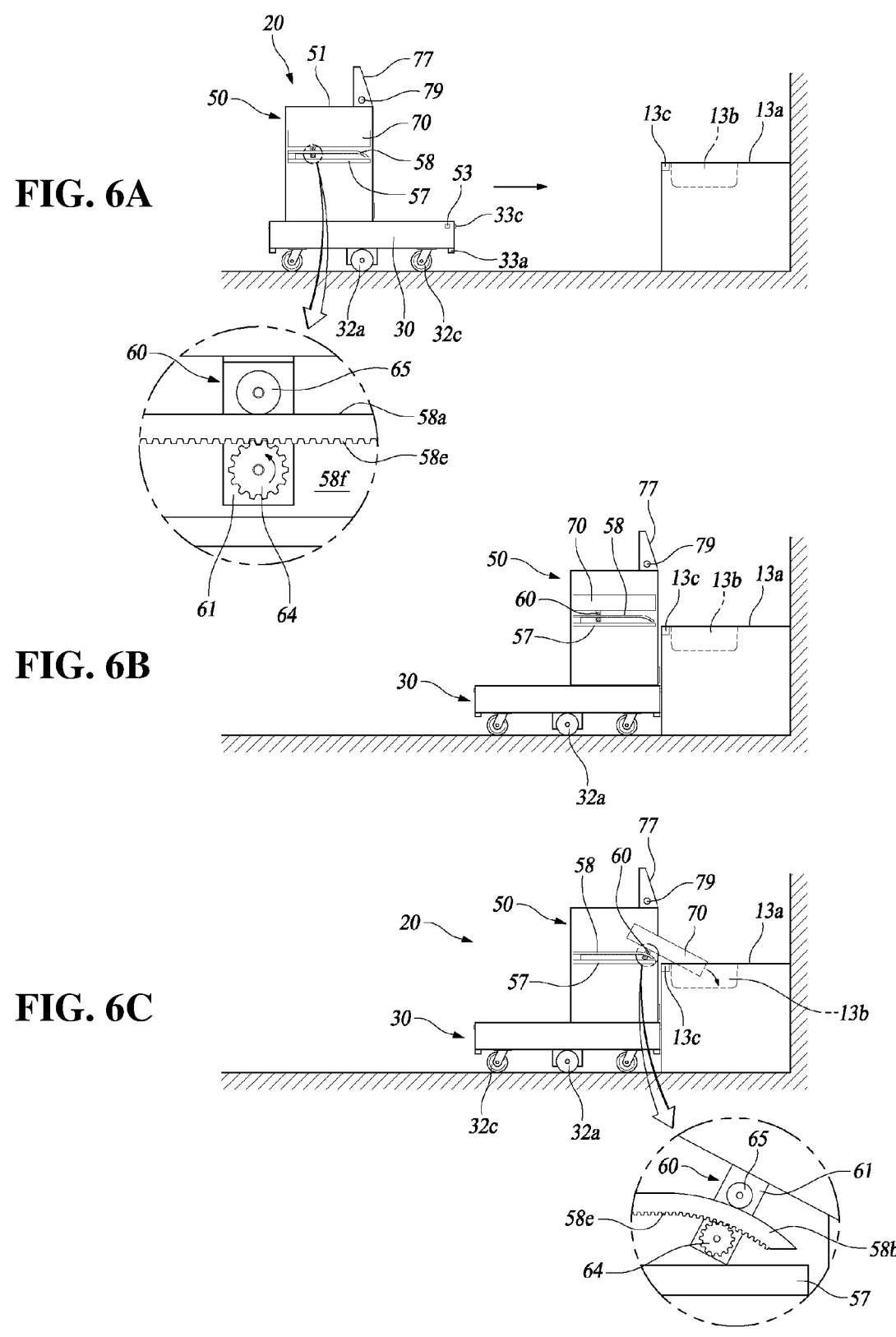
FIGS. 6A, 6B, and 6C are views for explaining an operation of a robot for transporting used treatment tools to a disinfection room, according to an embodiment of the present invention.

When the interval control motor 38 is driven by the control unit 36, the horizontal lead screw 39 axially rotates to advance the screw coupling block 51*c* in a direction indicated by arrow a or retreat the screw coupling block 51*c* in its opposite direction. For example, as shown in FIG. 6B, when the robot 20 arrives in front of the sink 13*a*, the horizontal lead screw 39 moves the unloader 50 forward in the direction indicated by the arrow a to bring the unloader 50 as close to the sink 13*a* as possible.

The housing 51, which is a structure installed above the traveling bogie 30, is open to the front and top, accommodates the elevating plate 57, the curved rails 58, and the tray 70 therein, and has a touch panel 77 installed thereon.

Vertical slits 51*a* are provided on both side walls of the housing 51, respectively. Each of the vertical slits 51*a* is a through passage extending in a vertical direction and having a certain width, and passes a side tab 57*a* formed in the elevating plate 57. The side tab 57*a* is exposed to the outside of the housing 51 through the vertical slit 51*a*.

An input unit 52 is located on a lower portion of the front surface of the housing 51. The input unit 52 is a manipulation unit manipulated by a user. The input unit 52 may include, for example, a switch for turning on/off the robot 20, a switch for temporarily stopping the traveling bogie 30, a switch for adjusting the height of the elevating plate 57, and a switch for sending a treatment tool to a disinfection room after loading the treatment tool.

The touch panel 77 installed above the housing 51 is an interface device that allows a user, that is, a doctor, nurse, or manager, to input data or commands through touching and also displays various types of information provided by the robot 20.

A speaker 79 is positioned in a lateral portion of the touch panel 77. The speaker 79 is a sound output unit that outputs various sounds while the robot 20 is being used.

The elevating plate 57 is a plate-type member installed inside the housing 51 to be able to move up and down, and has side tabs 57*a* at its both ends in the width direction. A female screw hole 57*b* is formed in each of the side tabs 57*a*. The front sensor 59 is located at a front end of the elevating plate 57. The front sensor 59 senses the height display unit 13*c*. Sensing information obtained by the front sensor 59 is transmitted to the control unit 36, and the control unit 36 controls a height control motor 54.

The front sensor 59 generates a detection signal at the moment when the front sensor 59 senses the height display unit 13*c* while ascending together with the elevating plate 57. At the same time, the control unit 36 stops the height control motor 54 to fix the elevating plate 57, and then operates a tray transfer motor 63 to be described later.

The height adjusting means adjusts the height of the elevating plate 57, and includes a vertical lead screw 55 and the height control motor 54. The height control motor 54 is fixed to either outer lateral surface of the bogie body 51, and axially rotates the vertical lead screw 55 in both directions. A lower end of the vertical lead screw 55 is fixed to a drive shaft of the height control motor 54, the vertical lead screw 55 passes through the female screw hole 57*b*, and an upper end of the vertical lead screw 55 is supported by a screw bearing 56. As the height control motor 54 is driven, the height of the elevating plate 57 is adjusted.

The curved rails 58 support the tray 70 so as to be movable in forward and backward directions, that is, forward and backward, and is coupled with a tray mover 60. Two curved rails 58 are spaced apart from each other in parallel to each other.

Each of the curved rails 58 is formed by bending a portion of a square bar, and has a traveling surface portion on its upper surface and a rack gear portion 58*e* on its bottom surface.

The traveling surface portion is a support surface on which a wheel bearing 65 rolls, and has a horizontal traveling path 58*a* and a curved downward traveling path 58*b*. The horizontal traveling path 58*a* is a horizontally extended portion, and the curved downward traveling path 58*b* is a curved portion whose inclination increases toward the front. The rack gear portion 58*e* meshes with a pinion gear 64.

The curved rail 58 is supported by a supporter 58*g*. The supporter 58*g* lifts the curved rail 58 from an upper surface of the elevating plate 57 to provide a rail lower space 58*f* below the curved rail 58. The rail lower space 58*f* is a space in which the pinion gear 64 moves.

The tray mover 60 is fixed to the lower surface of the tray 70, and reciprocates in a longitudinal direction of the curved rail 58 while being mounted on the curved rail 58.

The tray mover 60 has a support bracket 61, the wheel bearing 65, the pinion gear 64, and a tray transfer motor 63.

The support bracket 61 is a member obtained by bending a steel plate in an L shape, and is fixed to the lower surface of the bottom plate 71*a* of the tray 70. The wheel bearing 65 is a part supported by the support bracket 61, and rolls along the traveling surface portion while being seated on the traveling surface portion.

The pinion gear 64 meshes with the rack gear portion 58*e* within the rail lower space 58*f* while being supported by the support bracket 61. The tray transfer motor 63 is fixed onto a side of the support bracket 61 opposite to the pinion gear 64 and rotates the pinion gear 64 in both directions. The tray transfer motor 63 is controlled by the control unit 36.

When the tray transfer motor 63 is driven to rotate the pinion gear 64, the tray mover 60 travels in the longitudinal direction of the curved rail 58. Because the tray 70 is fixed to the support bracket 61, the tray 70 reciprocates in forward and backward directions. In particular, the tray 70 is tilted in a direction indicated by arrow e in FIG. 6C when the wheel bearing 65 passes through the curved downward traveling path 58b.

The tray 70 is a rectangular container for accommodating used treatment tools to be transported, and is supported by the support brackets 61.

The tray 70 includes a bottom plate 71a, side walls 71b, and a pair of doors 73. The bottom plate 71a, which is a rectangular plate having a certain thickness, is coupled to the support brackets 61. The side walls 71b are members that are vertically fixed onto both lateral ends and a rear end of the bottom plate 71a.

The doors 73 are located in front of the bottom plate 71a, but are mounted on the both side walls 71b through torsion hinges 75, respectively. The torsion hinges 75, which are hinges having built-in torsion springs, elastically support the doors 73 in a direction indicated by arrow f. The doors 73 are caught on the bottom plate 71a by the torsion hinges 75 and maintained in a closed state.

The doors 73 are closed due to an action of the torsion hinges 75 when the tray 70 is in a horizontal state. However, as shown in FIG. 6C, the tray 70 is opened by being pushed by the weight of treatment tools sliding down when being tilted.

FIGS. 6A, 6B, and 6C are views for explaining an operation of the robot 20 for transporting used treatment tools to a disinfection room, according to an embodiment of the present invention.

The doctor or nurse puts used treatment tools into the tray 70 of the robot 20 that has arrived, and then sends the robot 20 to the disinfection room 13.

After entering the disinfection room 13, the robot 20 approaches the sink 13a as shown in FIG. 6A. Then, as shown in FIG. 6B, when the traveling bogie 30 of the robot 20 completely approaches the sink 13a, the interval control motor 38 is operated to bring the unloader 50 into close contact with the sink 13a as much as possible.

When the position of the unloader 50 is determined, the height control motor 54 is driven to raise the elevating plate 57. When the front sensor 59 detects the height display unit 13c as the elevating plate 57 rises, the elevating plate 57 is stopped.

Next, the tray transfer motor 63 is operated to move the tray 70 in a direction indicated by arrow k in FIG. 6B. The tray 70 moves forwards and is positioned vertically above the disinfection tank 13b and at the same time is inclined in the direction indicated by the arrow e. As the tray 70 is tilted, the treatment tool accommodated in the tray 70 slides down, pushes the doors 73, and falls into the disinfection tank 13b. The movement of the treatment tool used in the treatment room 11 to the disinfection tank 13b is completed. When the above process is completed, the tray 70 is returned to its original position and returned to the wireless charging room 17.

While the present invention has been particularly shown and described with reference to exemplary embodiments thereof, it will be understood by those of ordinary skill in the art that various changes in form and details may be made therein without departing from the spirit and scope of the present invention as defined by the following claims.

[Description of reference numerals]

| 10: indoor space | 11: treatment room | 11a: call signal generator |
|---|---|---|
| 13: disinfection room | 13a: sink | 13b: disinfection tank |
| 13c: height display unit | | 15: travel detection line |
| 17: wireless charging room | | |
| 17a: wireless power transmission unit | | |
| 20: robot | 30: traveling bogie | |
| 31: bogie body | 31a: guide slits | 32a: driving wheels |
| 32b: wheel motor | 32c: driven wheels | 33a: tracking sensor |
| 33c: front sensor | 33d: rear sensor | |
| 35: wireless power reception unit | | |
| 36: control unit | 37: battery | 38: interval control motor |
| 39: horizontal lead screw | | |
| 39a: screw bearing | 50: unloader | |
| 51: housing | 51a: vertical slits | 51c: screw coupling block |
| 52: input unit | 53: communication unit | |
| 54: height control motor | | |
| 55: vertical lead screw | 39a: screw bearing | 57: elevating plate |
| 57a: side tabs | 57b: female screw hole | |
| 58: curved rails | 58a: horizontal traveling path | |
| 58b: curved downward traveling path | | 58e: rack gear portion |
| 58f: rail lower space | 58g: supporters | 59: front sensor |
| 60: tray movers | 61: support brackets | 63: tray transfer motors |
| 64: pinion gears | 65: wheel bearings | 70: tray |
| 71a: bottom plate | 71b: side walls | 73: doors |
| 75: torsion hinges | 77: touch panel | 79: speaker |

First, in a treatment room, when a doctor or nurse manipulates a call signal generator 11a, the robot 20 waiting receives a call signal through the communication unit 53, moves along the travel detection line 15, and arrives at the treatment room 11 that has sent the call signal. The tray 70 in a standby state is in a state of descending to the maximum.

The invention claimed is:

1. A robot for transporting used treatment tools to a disinfection room, the robot autonomously traveling along a traveling detection line, receiving a treatment tool discharged from a treatment room, and transporting the treatment tool to the disinfection room, in a place where the traveling detection line connecting the treatment room to the disinfection room is disposed on a floor, the robot comprising:

a traveling bogie comprising a bogie body including a driving wheel and a driven wheel, a battery built in the bogie body and supplying power, a control unit outputting a control signal, a tracking sensor for sensing the traveling detection line, and a front sensor and a rear sensor for sensing obstacles in front of and at rear of the bogie body in a traveling direction;

a housing installed on a top of the traveling bogie and providing support;

an elevating plate installed inside the housing to be capable of elevation;

height adjusting assembly adjusting the height of the elevating plate while being supported by the housing;

a tray provided on a top of the elevating plate to be position-adjustable and accommodating a treatment tool to be transported; and a tray mover configured to advance the tray toward the front of the housing, allow a tiltedly-accommodated treatment tool to slide down and pour down by gravity, and pull the tray back to an original position after the treatment tool is discharged, wherein a curved rail configured to support the tray to be movable in forward and backward directions, the curved rail having a traveling surface portion formed on an upper surface of the curved rail and a rack gear portion provided on a lower surface of the curved rail, and inclined downward toward the front, and a supporter configured to lift the curved rail from an upper surface of the elevating plate to provide a rail lower space under the curved rail are further installed on the upper surface of the elevating plate, and the tray mover comprises:

a support bracket fixed to a lower surface of the tray;

a wheel bearing supported by the support bracket and capable of traveling along the traveling surface portion while being seated on the traveling surface portion;

a pinion gear located in the rail lower space and meshing with the rack gear portion; and a tray transfer motor that is supported by the support bracket and rotates the pinion gear.

2. The robot of claim 1, wherein a sink having a disinfection tank is installed in the disinfection room, a height display unit informing the height of the disinfection tank is fixed to a front surface of an upper portion of the sink, the elevating plate takes a form of a plate and has female screw holes at both ends, and a front sensor configured to sense the height display unit and transmit a detection signal to the control unit when the elevating plate moves up and down and is located at the same height as the height display unit is installed in front of the elevating plate, and the height adjusting assembly comprises:

vertical lead screws screwed into the female screw holes, extending vertically, and supported by the housing to be axially rotatable; and a height control motor operated by the control unit and adjusting the height of the elevating plate by axially rotating the vertical lead screw.

3. The robot of claim 1, wherein the traveling surface portion comprises a horizontal traveling path that is horizontal at the top of the elevating plate, and a curved downward traveling path that increases in inclination toward the front, the tray comprises:

a bottom plate fixed to the support bracket; and side walls fixed vertically to both ends and a rear end of the bottom plate, and a door connected to the side walls by a torsion hinge, closed by an action of the torsion hinge when the tray is in a horizontal state, and opened by being pushed by a weight of the treatment tool sliding down when the tray is tilted forwards is installed in front of the bottom plate.

* * * * *